Figure 1:
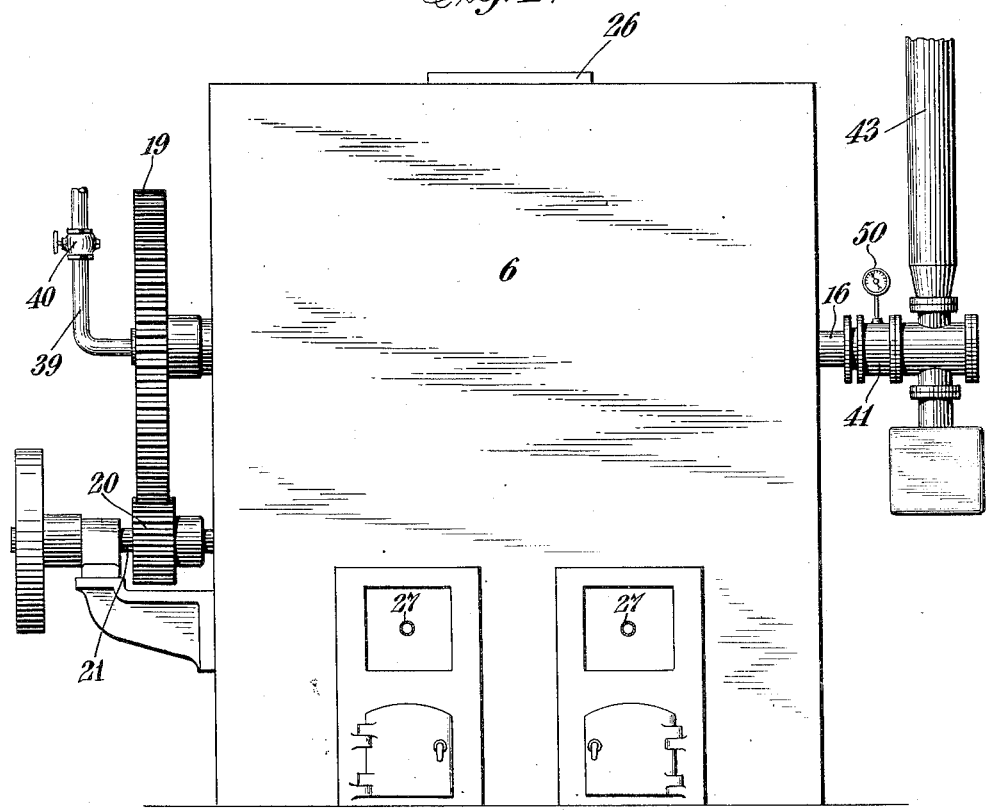

June 30, 1931.  H. B. BISHOP  1,812,770
METHOD FOR DECOMPOSING SALTS
Filed June 12, 1925  3 Sheets-Sheet 1

Inventor
Howard B. Bishop
By his Attorneys
Ward, Crosby & Smith

June 30, 1931. H. B. BISHOP 1,812,770
METHOD FOR DECOMPOSING SALTS
Filed June 12, 1925   3 Sheets-Sheet 2

Inventor
Howard B. Bishop
By his Attorneys
Ward, Crosby & Smith

June 30, 1931.  H. B. BISHOP  1,812,770
METHOD FOR DECOMPOSING SALTS
Filed June 12, 1925  3 Sheets-Sheet 3

Inventor
Howard B. Bishop
By his Attorneys
Ward Crosby & Smith

Patented June 30, 1931

1,812,770

UNITED STATES PATENT OFFICE

HOWARD B. BISHOP, OF SUMMIT, NEW JERSEY

METHOD FOR DECOMPOSING SALTS

Application filed June 12, 1925. Serial No. 36,578.

My invention relates to improvements in methods for decomposing salts.

The main object of my invention is to provide an improved method whereby salts may be decomposed by acids to produce other acids and salts, at such temperatures that there is a minimum of injury to the apparatus or to the products of the reaction. Furthermore according to my preferred method the non-volatile product of the reaction, called the by-product, is produced substantially as a neutral salt.

My improvements are especially applicable to the reaction between sodium chloride and sulphuric acid to form sodium sulphate and hydrochloric acid; the reaction between sodium nitrate and sulphuric acid to form nitric acid and sodium sulphate; and the reaction between calcium fluoride and sulphuric acid to form hydrofluoric acid and calcium sulphate. According to current practice the by-product of the action of sulphuric acid on sodium nitrate or sodium chloride is sodium acid sulphate, a substance of little commercial value and the production of which requires the use of a double quantity of sulphuric acid. At present two methods are used for mixing the acid with the salt to be decomposed. In one, called the batch method, the charge of salt is placed in the reaction vessel and a chemically equivalent portion of the acid is added and the vessel is closed and heated, with or without agitation, until the reaction is completed. During this period the evolution of the volatile acid which is being displaced by the acid used for decomposition, quite rapidly increases to a maximum. The descending curve of this evolution in these endothermic reactions is more gradual, its slope depending on the rate of the heat supply. To complete the reaction in reasonable time for commercial practice the heating is generally forced, resulting in some injury to the products as well as the apparatus.

The other commonly used method is known as the continuous one and differs from the first mainly in the rate of adding chemical equivalents of the reagents. Generally a continuous stream of each reagent is fed in at one place in the reaction vessel and the non-volatile reaction product is continuously removed in a small stream at another place. These streams are sometimes intermittent but chemical equivalents of the reagents are always added together with neither reagent in any considerable excess of the other so that in both methods the final completion of the reaction requires overheating with more or less injury.

I have found, however, that if the charge of salt to be decomposed is first heated by itself in the reaction vessel, below the melting point of the solid constituents and above the boiling point of the acid to be produced and volatilized, and while agitating, if the acid is added by spraying or other method of uniform distribution, at such a rate that the heat consumed and supplied are closely balanced, then, at any instant, there is but a small quantity of the entering acid in contact with a large heated body of the salt and by-product and there is immediate reaction. The mass of material in the reaction vessel is thus throughout the charge kept dry, loose and substantially neutral, even with such reagents as sulphuric acid and sodium nitrate which have heretofore substantially given only sodium acid sulphate as a by-product.

Such reagents as calcium fluoride and sulphuric acid may be worked on a large scale by this method at temperatures not exceeding 200° C. and thus the destructive action on both apparatus and products of the reaction caused by the usual high temperature needed to complete this reaction is entirely obviated. Organic salts, such as calcium acetate may be advantageously decomposed by this method and other acids, such as phosphoric acid may be used for decomposing various salts.

Figure 2:
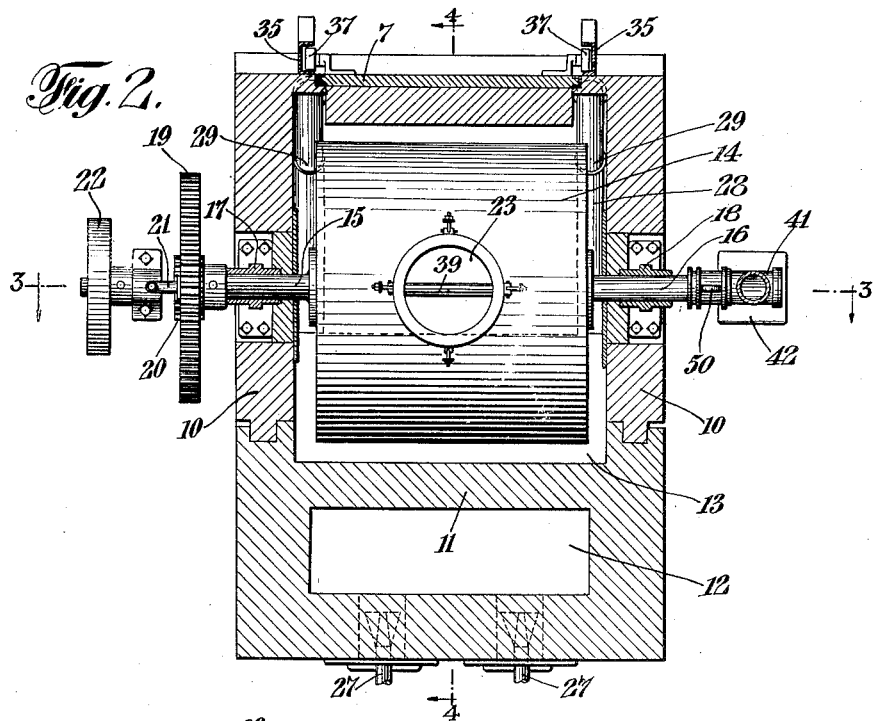
Figure 3:
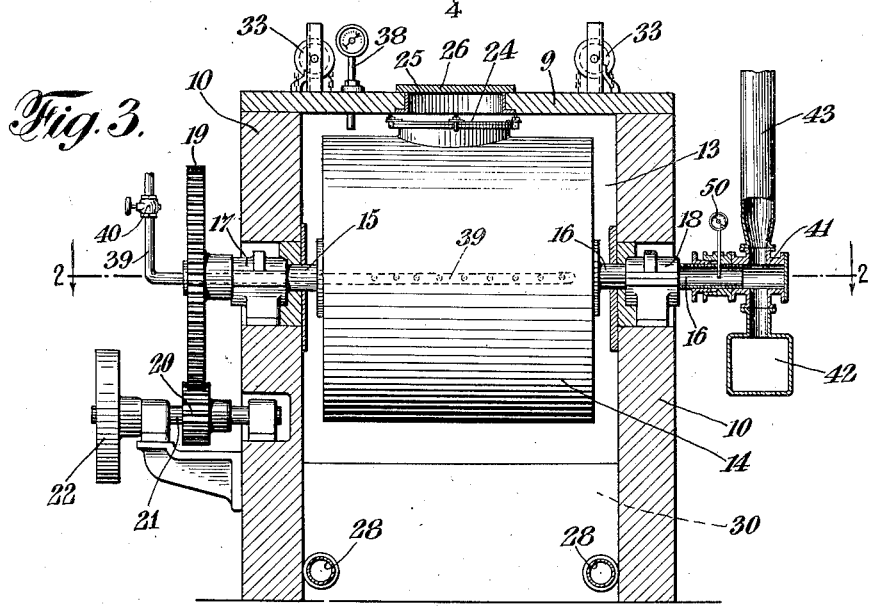
Figure 4:
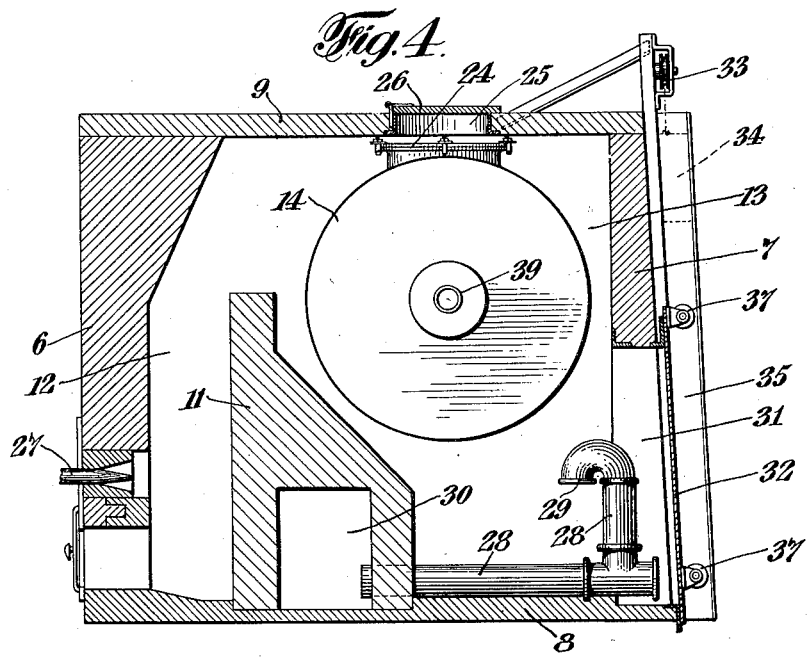
Figure 5:
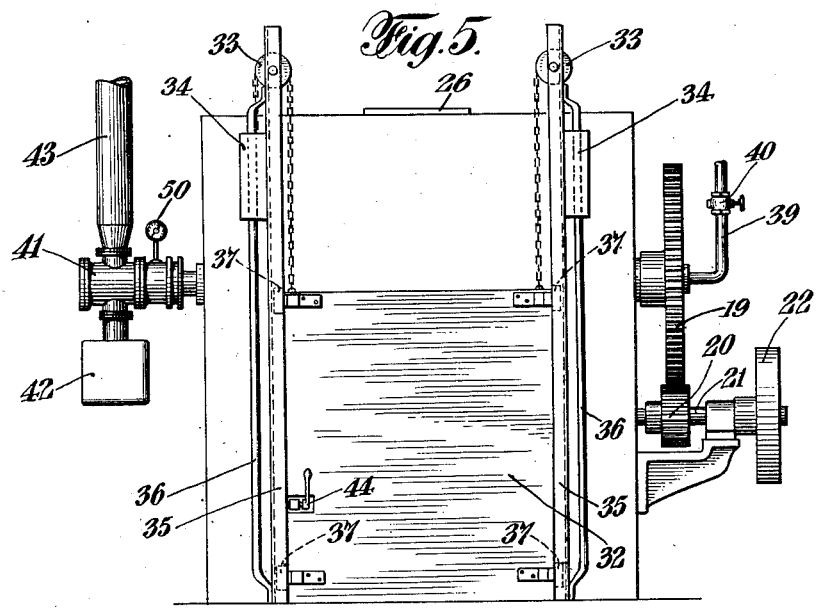

While any suitable apparatus may be used for carrying out the method, I will describe an apparatus which I have found suitable for certain of the reactions. This apparatus is illustrated in the accompanying drawings in which Fig. 1 shows a front elevation of the apparatus; Fig. 2 is a horizontal section taken on the lines 2—2 of Fig. 3; Fig. 3 is a vertical section taken on the lines 3—3 of Fig. 2; Fig. 4 is a vertical section taken on the lines 4—4 of Fig. 2 and Fig. 5 shows a rear elevation of the apparatus.

Referring to the drawings there is there shown a suitable brick work housing having a front wall 6, rear wall 7, bottom 8, top 9 and sides 10. 11 represents a vertical brickwork partition built up in the front part of the housing forming a fire box or furnace chamber 12 open at the top so that the hot gases therefrom will pass up over into the main heating chamber 13. Arranged to be rotatable about a horizontal axis in the top portion of the chamber 13 is a cylindrical drum 14 in the nature of a ball mill. The drum 14 is provided with horizontal axles 15 and 16 resting in bearings 17 and 18 respectively located in the brick work of the sides 10. The axle 15 has secured thereto a gear 19 driven by a smaller gear 20 fixed on shaft 21 to which is rigidly secured the belt pulley 22. Upon driving the pulley 22 the gear 20 drives gear 19 and axle 15 to rotate the drum 14 at suitable speed. The drum 14 is provided with a suitable charging opening at 23 provided with a removable cover 24 which may be securely locked in place to close the charging opening when the drum is rotated. A corresponding man-hole charging opening 25 is provided in the top 9 adapted to be closed by a suitable cover 26. When the drum is rotated so that the opening 23 is in its uppermost position it is directly under the opening 25.

To heat the charge in the drum 14 combustible gases, oil or other fuel may be introduced through pipes 27 and burned in the chamber 12 whereupon the hot gases of combustion pass over into the chamber 13 and down around the drum 14, heating the same and the charge therein, and the gases finally pass out by entering exhaust pipes 28 at 29 and pass through the pipes 28 to the built-in flue 30 which may be connected with a suitable chimney or stack outside of the apparatus.

The rear side 7 of the housing is provided with a large opening at 31 adapted to be closed by a vertically sliding door 32. To aid in raising the door it has connected thereto cables passing over pulleys 33 and to which cables are attached counter-weights 34 adapted to slide vertically on the outside of the door guides 35. To guide the counter-weights they are apertured to receive vertical fixed rods 36. The door is provided on the outside with wheels or rollers 37 rolling within the guide members 35 to cause the door to fit close to the door frame. When it is desired to remove the residue of a charge from the drum 14 the latter is rotated with cover 24 removed, whereby the material in the drum 14 is deposited on the bottom of the chamber 13 and by opening the door 32, is easily removed through the opening 31.

For determining the temperature within the chamber 13 a recording thermometer is inserted at 38.

For the purpose of introducing acid into the drum 14 when the charging opening 23 is closed, there is provided a stationary pipe 39 which passes axially through the axle 15 and gear 19 and into the drum 14. A valve 40 is provided to control the admission of acid through the pipe which is sprayed onto the charge in the drum through a plurality of holes in the pipe 39 in the drum whereby the acid is not only gradually added but is widely distributed over the batch of salt in the drum as and when the acid is gradually added. The acid may be suitably heated before being so introduced into the drum. As previously pointed out in adding the acid to the mass, it is important that it be uniformly distributed at such a rate that the heat consumed and supplied are closely balanced, whereby in any instance there is but a small quantity of the entering acid in contact with a large heated body of the salt and by-product so that immediate reaction occurs. The term "spraying" or similar term as used in the specification and claims is intended to include such method of uniform distribution and to comprise not only the delivery of detached particles of acid, i. e. spray, to the surface of the mass, but also the delivery of the acid in a plurality of fine streams, which may break up into particles before or upon contact with the reaction mass.

To provide means for collecting and recovering the volatilized acid or gases or vapors given off in the drum while it is closed to the outside atmosphere, the axle 16 is made hollow and there is connected thereto a pipe junction 41 to the underneath side of which is connected a drip container 42 for collecting any acid or condensed liquid which may be given off through the hollow axle 16. The container 42 may be tapped in any suitable manner to remove the acid collected therein. To the upper part of pipe connection 41 is connected a pipe 43 leading to any suitable apparatus for collecting and recovering the gases and vapors given off from the charge in the drum 14.

For purposes of illustration I will describe one way in which my improvements may be carried into effect and for this purpose I shall assume that sodium nitrate is to be decomposed with sulphuric acid, although, of course, the process is likewise applicable to the reaction between other salts and acids.

The door 32 is lowered to close the opening 31, the door being held tightly in place by a latch 44. A charge of finely divided sodium nitrate is introduced into the drum through openings 25 and 23. The openings 23 and 25 are then closed. The drum is then revolved and fuel from pipe 27 burned in the chamber 12 to heat up the charge while the drum is being revolved, to keep the batch agitated. When the charge has been heated to about 175° C. which is above the boiling point of the nitric acid and below the melting point of the charge of salt or salts in the drum, the sulphuric acid is sprayed into the charge in the drum from the perforated pipe 39. The acid is sprayed in no faster than the heat supply can support the reaction and so that the volatilization of the nitric acid produced takes place substantially as fast as the nitric acid is formed. The acid is added so slowly that there is practically no balling up of the mass and it is maintained in a dry finely divided condition. Under these conditions the reaction is,

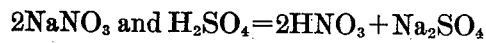

and not the usual,

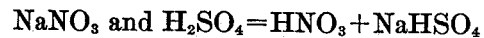

When, after several hours, all the sulphuric acid has been added, the heating is continued for another hour but at the same low temperature. The nitric acid produced and so uniformly volatilized at a temperature just above its boiling point during the reaction is substantially continuously given off through the axle 16 and pipe 43 and collected and recovered in any suitable condensing apparatus. The loose dry sodium sulphate formed is finally removed by removing the cover to the charging opening 23 and the drum again rotated to discharge the sodium sulphate in front of the opening 31 through which it is removed.

It will be noted that the temperature at which the batch is kept during the reaction is below the melting points of the solid constituents, i. e., below the melting points of the salts which in the above example were sodium nitrate and sodium sulphate. Also the temperature was above the boiling point of the acid to be volatilized which in the above example was nitric acid, so that immediately on its formation the acid is volatilized and given off leaving the remaining solid material in a dry and loose form. Also, as indicated, the reaction is carried out at substantially atmospheric pressure in the drum.

The sulphuric acid, before entering the drum, may be preheated if desired, but this is not essential.

After the first batch of sodium nitrate has been thus decomposed and the products produced removed from the apparatus, further batches of sodium nitrate may be similarly treated and the operation repeated as desired. In carrying out the invention very little labor is required and the drum may be made relatively thin so that relatively little heat is required to heat the charge. The nitric acid gas is given off at a sufficiently uniform rate and of approximately 100% concentration after the original air in the drum has been displaced. This simplifies the operation and the recovery of the nitric acid and results in a relatively high yield of acid. Since an excess of the sodium nitrate over the sulphuric acid is maintained during substantially the entire reaction, very little sulphuric acid is carried out of the drum with the nitric acid gas. From the above it will appear that I have provided a novel method of decomposing salts with acids and of producing neutral salts which in the examples described, has not heretofore been commercially possible.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

Thus while I have described my invention in considerable detail and with respect to a preferred form thereof, I do not desire to be limited to such details or form since many changes and modifications may be made and the invention embodied in widely different forms without departing from the spirit and scope thereof in its broader aspects. Therefore, I desire to cover all modifications and forms coming within the language or scope of any one or more of the appended claims.

What I claim as new and desire to secure by Letters Patent is:

1. The method of decomposing calcium fluoride with sulphuric acid to form hydrofluoric acid and calcium sulphate, which consists in heating a batch of calcium fluoride and while it is so heated, agitating the batch and gradually mixing therein the sulphuric acid, the reaction being carried out substantially at atmospheric pressure and the sulphuric acid being widely distributed by spraying on to the batch and being added so slowly that there is substantially no balling up of the mass.

2. The method of decomposing calcium fluoride with sulphuric acid to form hydrofluoric acid and calcium sulphate which consists in heating the calcium fluoride to a temperature below the melting points of calcium fluoride and calcium sulphate and above the boiling point of hydrofluoric acid and widely distributing by gradually spraying on to the batch the required amount of sulphuric acid.

3. A method of decomposing a salt with an acid which consists in agitating the salt and heating it above the boiling point of the acid to be volatilized and below the melting point of the solid constituents and then adding the acid and boiling off the volatile product at a balanced rate, the added acid being gradually sprayed on to the batch.

4. The method of decomposing calcium fluoride with sulphuric acid to form hydrofluoric acid and calcium sulphate, which consists in heating a batch of calcium fluoride to a temperature above the boiling point of the hydrofluoric acid and below the melting points of calcium fluoride and calcium sulphate, and while so heated and while the batch is being stirred, spraying the sulphuric acid over the surface of the batch, the acid being added so slowly that there is substantially no caking of the mass and the reaction being carried on at substantially atmospheric pressure.

In testimony whereof I have signed my name to this specification.

HOWARD B. BISHOP.